March 19, 1974    3,798,099

METHOD FOR SPLICING OPTICAL FIBERS

Filed June 12, 1972    5 Sheets-Sheet 1

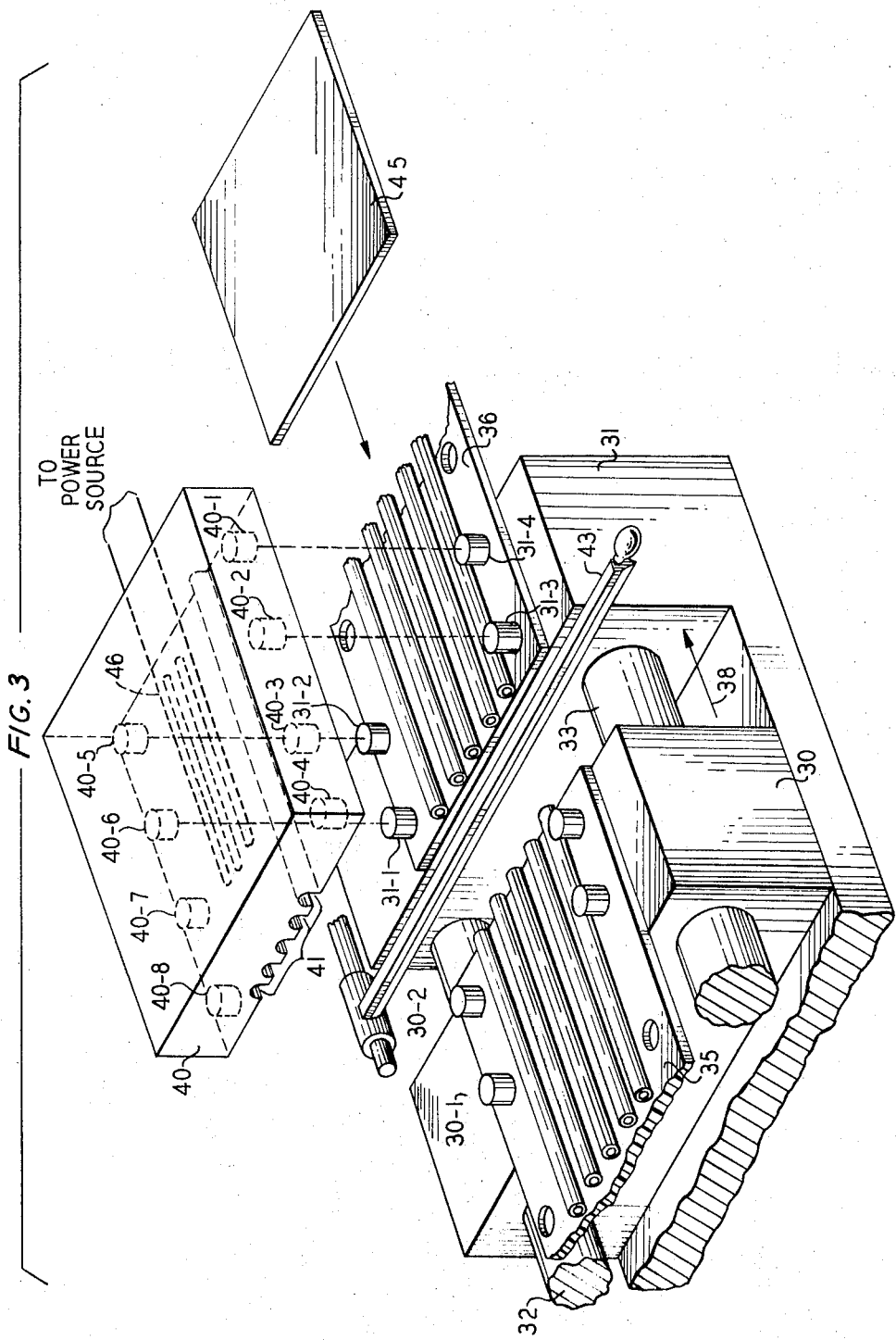

March 19, 1974  E. A. J. MARCATILI  3,798,099
METHOD FOR SPLICING OPTICAL FIBERS
Filed June 12, 1972  5 Sheets-Sheet 4
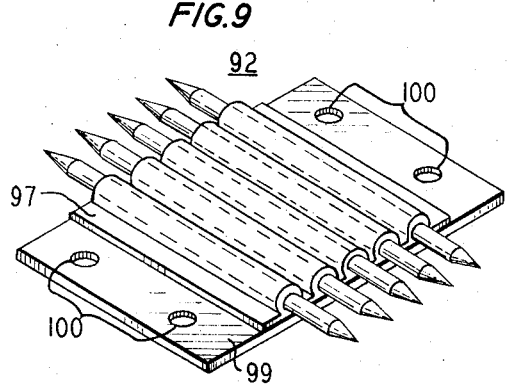
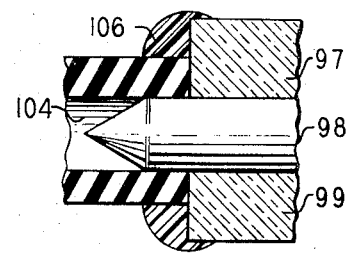
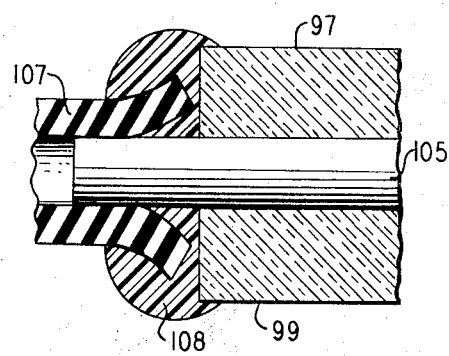
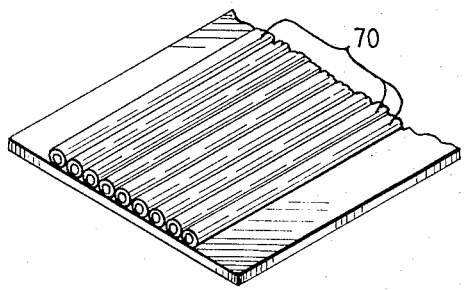
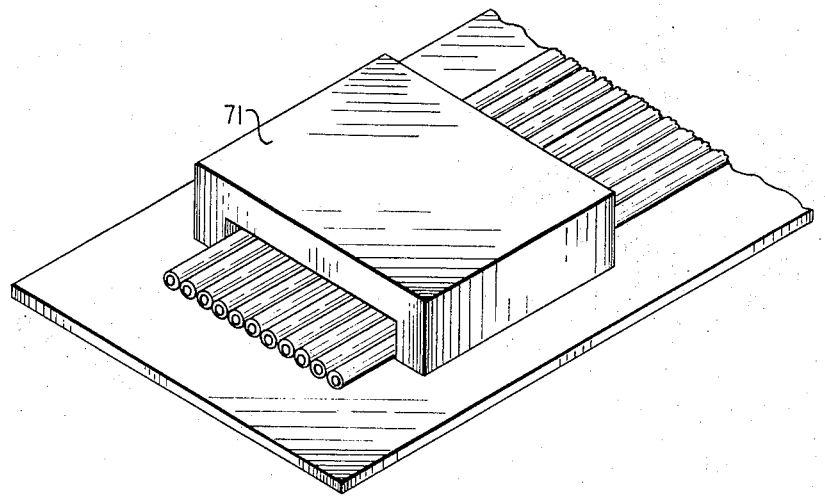

United States Patent Office 3,798,099
Patented Mar. 19, 1974

3,798,099
METHOD FOR SPLICING OPTICAL FILMS
Enrique Alfredo Jose Marcatili, Rumson, N.J., assignor to Bell Telephone Laboratories, Incorporated, Murray Hill, N.J.
Filed June 12, 1972, Ser. No. 262,002
Int. Cl. B65h 69/02, 69/06
U.S. Cl. 156—158                            5 Claims

ABSTRACT OF THE DISCLOSURE

An arrangement of optical fibers, apparatus and methods for splicing same, are described. The fiber arrangement comprises a plurality of fibers secured to a ribbon-like tape. The fiber segments to be spliced are mounted on the slideable holders of a splicer such that each of the fibers of one segment are aligned approximately coaxially with a fiber on the other segment. The individual fibers are then cut, as required; moved into position; more accurately aligned by mechanical means; and then bonded together by the application of either heat or a bonding material of suitable refractive index. In one arrangement, accurate alignment of the fibers is obtained by means of a grooved cover plate which is placed over the adjacent ends of the fibers and left in position until the bonding step is completed. Various means for mounting the fiber segments in the splicer and for strengthening the splice are disclosed. A modified splicer for liquid core fibers is also described.

---

This application relates to optical fibers and to apparatus and methods for splicing such fibers.

BACKGROUND OF THE INVENTION

There is, currently, a great deal of interest in the use of solid and liquid core dielectric fibers as waveguides at optical frequencies, in much the same way as wires and metallic waveguides are used at the lower frequencies. However, if such fibers are to be used in this manner, it is evident that there will be a corresponding need for a quick, convenient and inexpensive means for splicing sections of fibers together in the course of their use.

It is, therefore, the broad object of this invention to splice optical fibers in a mechanically sound and optically efficient manner.

To be practical, however, a splicing technique must resolve the alignment problem. When one considers that optical fibers have core diameters ranging from a few microns to a few mils, and that an alignment error of a little as half a diameter will result in a coupling loss of about 3 db, the magnitude of the problem becomes apparent.

It is, accordingly, a more specific object of the present invention to splice optical fibers in a manner which automatically aligns the fibers during the splicing process.

SUMMARY OF THE INVENTION

This application describes arrangements of groups of fibers which can be formed into cables, and methods and apparatus for splicing same. Specifically, a fiber group, in accordance with the present invention, comprises a plurality of fibers secured to a ribbon-like tape. The fiber group segments to be spliced are mounted on the holders of a splicer such that each of the fibers of one segment is aligned approximately coaxially with a fiber on the other segment. The individual fiber ends and the tape ends are cut flat; bonding material, of matching refractive index, is placed on each fiber end of at least one segment; and the two segments placed in contact. To insure accurate alignment of the respective fibers, a cover plate, accurately dimensioned to fit over the fibers, is placed over the adjacent ends of the fibers and left in position until the bonding material sets. Alternatively, the fibers can be spliced to each other by the application of heat.

In a first specific embodiment of the invention, the tape is supplied with registration holes longitudinally distributed along at least one edge, and the holders on the splicer are equipped with corresponding registration posts for securing the fiber segments in approximate alignment. In an alternate embodiment, the tape holders are provided with slots into which the segments to be spliced are placed. The latter type of splicer can be used to splice fiber groups whose tapes are not provided with registration holes although, as is apparent, fibers whose tapes are provided with such holes can also be spliced by such means.

In accordance with one method of splicing, the cover plate is removed after the bonding step. In accordance with an alternate method, the cover plate is permanently bonded to the spliced fiber segments for added strength. In accordance with a third method, a patch is placed between the fiber segments and the cover plate, and only the patch is bonded to the two groups of fibers for added strength. In this latter case, the cover plate is removed after the bonding step.

To splice liquid core fibers, a coupler section, comprising a plurality of dielectric pins embedded in a supporting matrix, is interposed between and bonded to the fibers to be spliced. The pins serve both to align and to couple the respective fibers.

It is an advantage of the invention that the fibers are automatically aligned during the course of the splicing procedure by solely mechanical means. No special optical equipment or special alignment procedures are required.

These and other objects and advantages, the nature of the present invention, and its various features will appear more fully upon consideration of the various illustrative embodiments now to be described in detail in connection with the accompanying drawings.

BRIEF DESCRIPTION OF THE DRAWING

FIG. 3 shows a first embodiment of splicing apparatus for splicing fiber groups of the type illustrated in FIG. 1;

FIG. 6 shows a second embodiment of a group of optical fibers mounted on a tape wherein the fibers are in contact along their length;

FIG. 7 shows a cover plate for aligning the fibers illustrated in FIG. 6;

FIG. 9 shows one embodiment of a coupler section, comprising a plurality of dielectric pins, used to splice liquid core fibers; and FIGS. 10A and 10B show the dielectric pins of a coupler section inserted into the core region of a liquid core fiber.

DETAILED DESCRIPTION

Figure 1A:
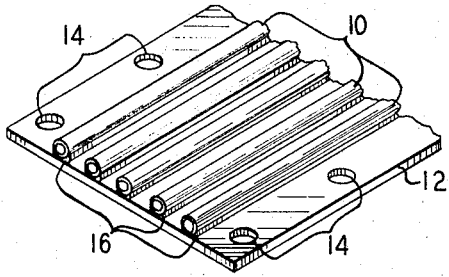
FIGS. 1A and 1B show a group of optical fibers arranged in accordance with the present invention.
Figure 1B:
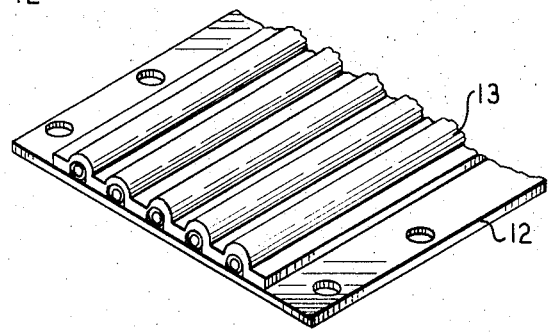

Referring to the drawings, FIGS. 1A and 1B show two embodiments of a group of optical fibers 10 arranged in accordance with one aspect of the present invention. In both, the fibers, each of which can be individually clad, are mounted on a ribbon-like tape 12. For reasons which will become apparent hereinbelow, the fibers are uniformly spaced from each other, and mounted in a manner to permit some slight transverse movement of the fibers, when forced. In the embodiment of FIG. 1A, each of the fibers is cemented, or otherwise secured to tape 12 over a very limited portion of its circumference. In particular, the joining material 16 should not extend beyond the lower half of the fiber circumference. In the embodiment of FIG. 1B, the fibers are held in place by means of a thin, conforming covering tape 13 which is joined to tape 12 in the regions adjacent to each of the fibers. The fibers themselves, however, are not rigidly connected to either of the tapes. In addition, in each of these embodiments tape 12 is supplied with uniformly spaced registration holes 14 along at least one, but preferably along both sides.

Figure 2A:
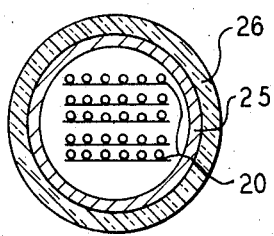
FIGS. 2A and 2B show a plurality of such fiber groups disposed within a common protective jacket to form a cable.
Figure 2B:
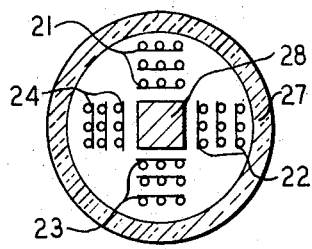

To form a cable, a plurality of such fiber groups are disposed within a common enclosure. As illustrated in FIG. 2A, a plurality of fiber groups 20 are disposed within a first, strengthening jacket 25, and a second, protective jacket 26. In a second arrangement, shown in FIG. 2B, a plurality of fiber groups 21, 22, 23 and 24 are disposed adjacent to the four sides of a centrally located strengthening core 28. The core and fiber groups are then surrounded by an outer, protective jacket 27. In both cables, the vacant space within the jacket can be filled with a suitable filler material to maintain a fixed relationship among the fiber groups.

Fibers are typically spliced either to lengthen them or to repair a break. In the formed situation, and in some instances of the latter as well, the fiber sections to be spliced will have been prepared for splicing at the factory. As such, certain steps, including cutting the fiber ends evenly, will not be necessary. On the other hand, repairing breaks by splicing the existing fibers will, in general, require a number of preparatory steps. In the discussion that follows, most of the more common preparatory steps will be included in the discussion for purposes of completeness.

The above-described arrangements of fibers are spliced by means of a splicer, whose essential parts are illustrated in FIG. 3. Basically, the splicer comprises a pair of holders 30 and 31 upon which the fiber group segments to be spliced are placed. In particular, each of the holders is provided with registration posts 30–1 . . . 30–4 and 31–1 . . . 31–4 of a size and distribution to correspond to the registration holes 14 along the edges of the tapes. In addition, one of the holders, 30, is slideably mounted on a pair of rods 32 and 33 so that is can be moved relative to holder 31, as indicated by arrow 38.

The splicer is also equipped with an alignment cover plate 40. In the configuration shown, the latter is supplied with a number of circular recesses 40–1, 40–2 . . . 40–8 along its edges, which comport with the arrangement of registration posts on holders 30 and 31 when the holders are positioned in contact with each other. Alternatively, the cover plate can be connected to the splicer frame and lowered into position when in use. In addition, plate 40 has a plurality of longitudinally extending parallel grooves 41, equal to the number of fibers per fiber group.

To make a splice, the two fiber segments 35 and 36 are placed upon the holders 30 and 31, respectively, with the registration posts of the latter extending through the registration posts of the latter extending through the registration holes along the tapes. So mounted, the individual fibers are coaxially aligned within the tolerance limits set by the cable manufacturing process. The ends of the fibers and the tapes are then cut flush with the adjacent ends of the holders, if necessary, by means of a suitable cutter 43, or in the manner described by D. L. Bisbee in his article entitled "Optical Fiber Joining Technique" published in the December 1971 issue of the Bell System Technical Journal, pages 3155–3158. A drop of bonding material is then placed on the exposed surface of each of the fibers and, advantageously, on the transverse edges of the two tapes. The holders are then pushed together such that the fiber ends and the tape ends make contact.

As indicated hereinabove, the accuracy of the initial alignment of the fibers is a function of the tolerance limits inherent in the cable manufacturing process. However, it is known that the transmission efficiency of the splice will fall off markedly with even a very slight transverse misalignment of the longitudinal axes of the two fibers. Accordingly, a final, more accurate alignment is made by means of the grooved cover plate 40. As indicated above, the latter is provided with a plurality of accurately made grooves whose transverse dimension is equal to the outside diameter of the fibers. Thus, when the plate is placed in position over the splice, the fibers are automatically forced into a more accurate alignment. The plate is left in position until the bonding material sets, thus completing the splice.

In an alternative method, instead of using a separate bonding material, the fibers are spliced solely by the application of heat. In this latter case, the cover plate 40 is provided with a heating coil 46 which heats the fibers, causing them to fuse together in the manner described in the above-identified article by Bisbee.

Figure 4:
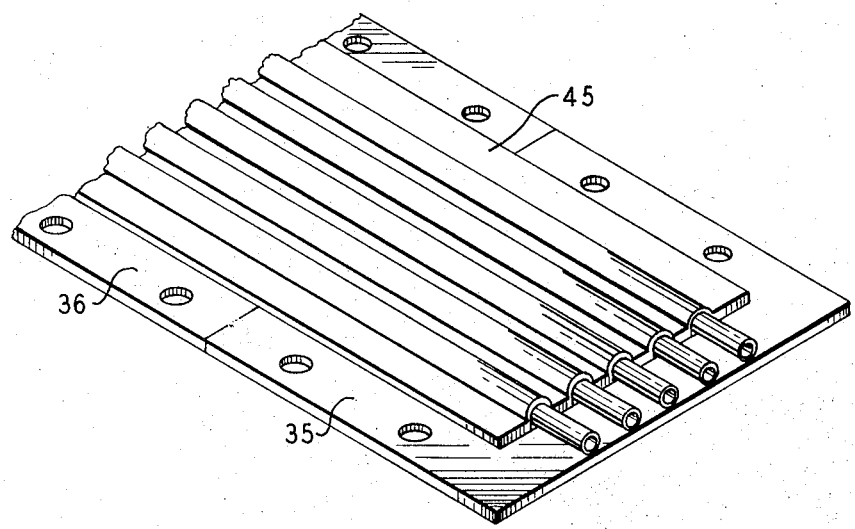
FIG. 4 shows a splice including a patch for added strength.

The strength of a splice made in the manner described depends upon the strength of the bond along the tape edges and the bond provided by the fibers. Added strength can be provided, if deemed necessary, in accordance with a second method, by the inclusion and the bonding to the two fiber groups of a patch 45, shown in FIG. 3, which overlaps the ends of the spliced segments. Specifically, the splice is made as described hereinabove, except that the patch material is inserted between the fibers and cover plate 40 such that when the cover plate is placed into position and engages the fibers, the patch is forced over and into contact with the fibers and tapes, as illustrated in FIG. 4. The patch is bonded to the fibers and tapes by means of an epoxy cement or a thermal patch can be made by the application of heat. It is apparent that in this second method, the width of the grooves 41, and the space between fibers must be made correspondingly larger to accommodate the patch material.

In accordance with a third method, the cover plate 40 is a separate, disposable element that is bonded to the spliced fiber groups and becomes an integral part thereof. In this arrangement, the cover plate 40 is made of a plastic, or a comparable material, and the grooves embossed thereon by pressing the heated cover plate onto a mold. Cover plates can be manufactured in large numbers by this means and when used, cemented, or otherwise bonded to the spliced fibers, thereby simultaneously aligning the fibers and strengthening the splice.

Figure 5:
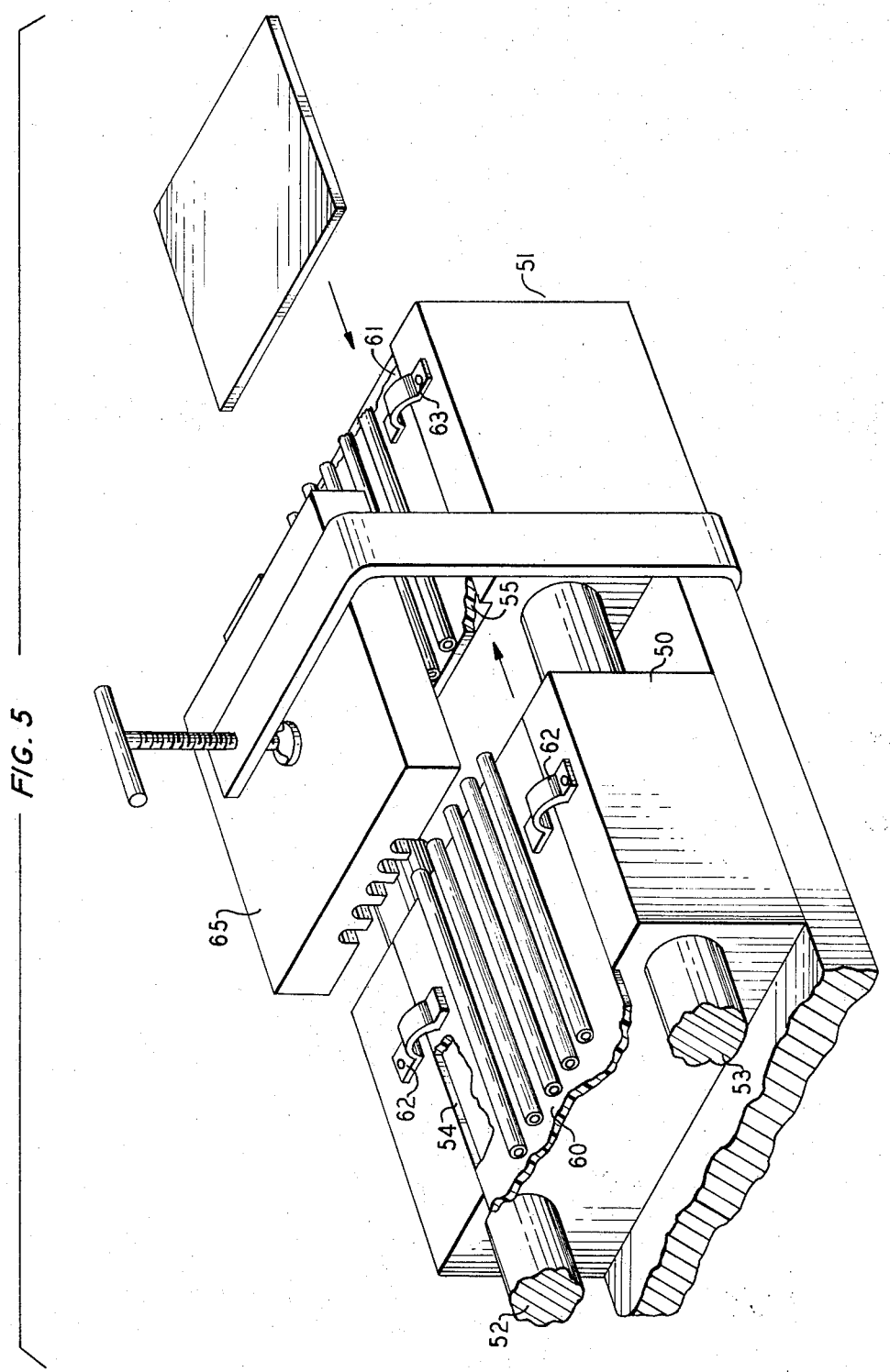
FIG. 5 shows a second embodiment of a splicer in accordance with the present invention.

FIG. 5 shows the essential elements of a second embodiment of a splicer in accordance with the present invention comprising, as in FIG. 3, a pair of holders 50 and 51, one of which, 50, is slideably mounted on posts 52 and 53. Instead of registration posts, holders 50 and 51 are provided with longitudinal slots 54 and 55 into which the fiber group segments 60 and 61 to be spliced are placed. Spring loaded retention means 62 and 63 keep the fiber groups securely in place. As before, a grooved cover plate 65 is provided for the final, more accurate alignment of the fibers. Aside from the means of holding the fibers, the splice is made as described hereinabove in connection with FIG. 3.

It will be noted that fiber segments 60 and 61 are, in all respects, similar to the fiber group illustrated in either FIG. 1A or 1B except that the tape is not provided with registration holes. Such holes are not required inasmuch as they are not used in this embodiment of the invention to secure the fibers on the holder. However, it is apparent that tapes with registration holes can also be handled by means of a slotted-holder splicer of the type described.

A specific embodiment of a multimode fiber group, in accordance with the present invention, would comprise a one mil thick by 80 mil wide Mylar tape, upon which are mounted twenty fibers having a two mil outside diameter, spaced one mil apart. While the exact tape dimensions and the number of fibers will typically vary, depending upon the specific application, the example given is considered characteristic of a multimode fiber group, within about an order of magnitude.

As indicated above, it is most important that the spliced fibers are accurately aligned. In the arrangements described hereinabove, the fibers are handled as a group but are individually aligned by means of the grooved cover plate. This is necessary insofar as the individual fibers, though nominally identical, nevertheless will have somewhat different diameters due to variations in manufacture. With greater care in the manufacturing process, however, the diameters of all the fibers can be made to lie within specified limits which would then permit the collective alignment of the fibers. In this case, the fiber groups are constructed, as illustrated in FIG. 6, with adjacent fibers 70 in contact, instead of spaced apart, as in FIG. 1A. To complete the alignment, the cover plate 71 is not grooved so as to accommodate the individual fibers, but is uniformly recessed to accommodate the group of fibers. Since, as was indicated above, the fibers have been manufactured more carefully and are, therefore, more unifor, they can now be aligned as a group. In all other respects, the splicing apparatus and method described above is the same for the groups of fibers shown in FIG. 6.

It should be emphasized that in both of the above-described methods, the fibers themselves are directly aligned. In one case, each fiber is handled individually. In the second case, the fibers are handled as a group. To attempt to extend this technique further so that the fibers can be aligned by merely placing the ends of a fiber cable in contact, and aligning the cable as a whole, would require that the entire cable, including the strengthening and protective portions be a precision structure. Such a requirement could be economically prohibitive. Accordingly, in each case, the fiber tapes must be exposed and manipulated during the splicing procedure.

Figure 8:
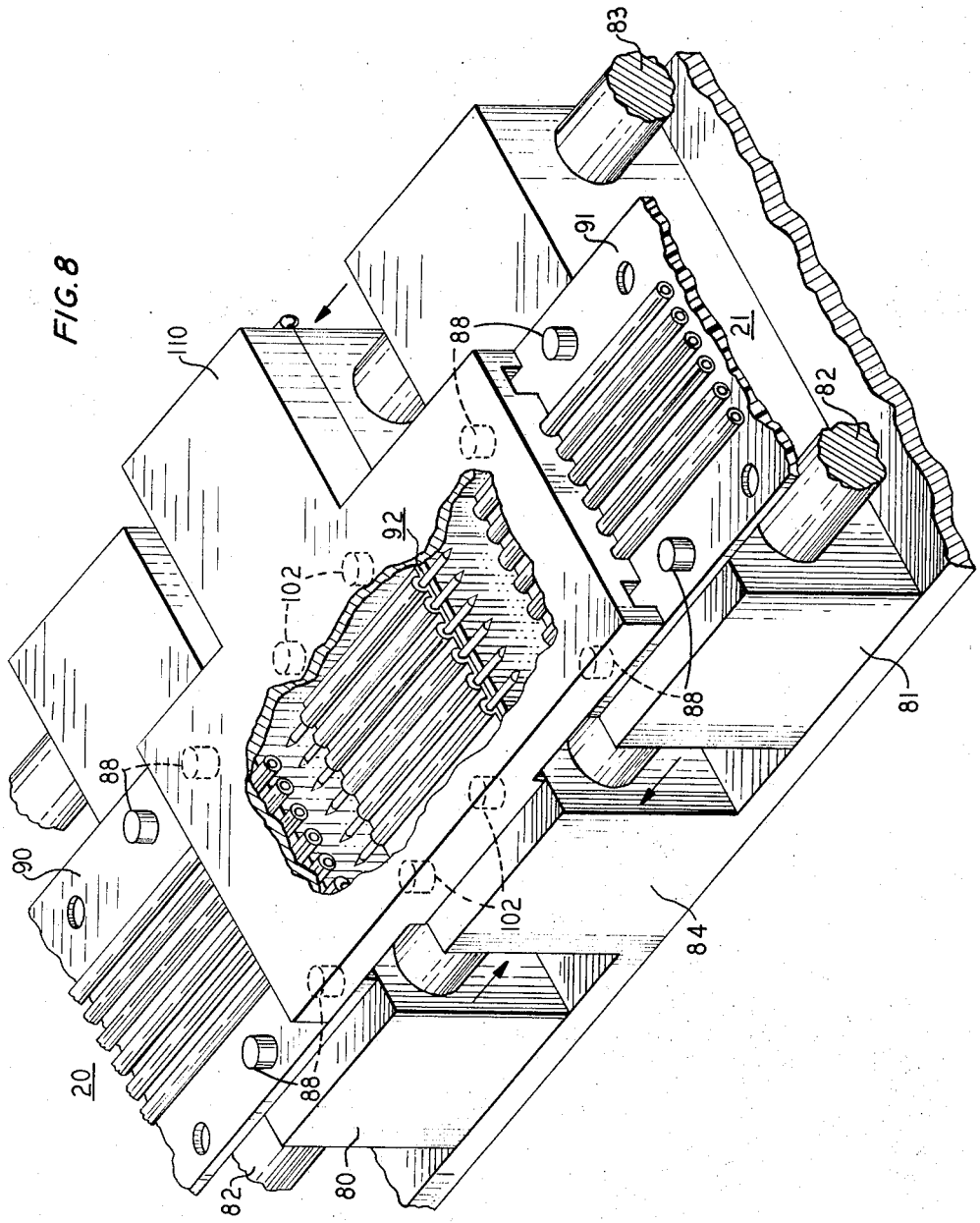
FIG. 8 shows apparatus for splicing liquid core fibers.

Thus far we have considered solid core fibers. However, with some modification, as illustrated in FIG. 8, the techniques herein described can be extended to provide means for splicing liquid core fibers as well. Referring specifically to FIG. 8, a splicer in accordance with this aspect of the invention comprises a pair of holders 80 and 81, slideably mounted on posts 82 and 83. The latter are mounted on a fixed coupler holder 84 which is located between the movable holders. For purposes of illustration, holders 80 and 81 are provided with registration posts 88 adapted to receive fiber groups whose tapes are provided with registration holes. Thus, to make a splice, the two fiber group segments 90 and 91 are placed upon holders 80 and 81, respectively, such that the registration posts 88 of the latter extend through the registration holes along the tape edges. Aside from the fact that the fibers have liquid cores, the fiber groups are the same as that illustrated in FIGS. 1A and 1B.

After the fiber groups are mounted in place, a prefabricated coupler section 92, such as is illustrated in FIG. 9, is mounted on coupler holder 84. The coupler section comprises a plurality of solid dielectric pins 98, equal to the number of fibers per group, mounted between two pieces of tape 97 and 99. For matching purposes, the difference between the refractive indices of the pins 98 and the tapes 97 and 99 (i.e., $n_{pin} - n_{tape}$) in advantageously equal to the difference between the refractive indices of the fiber core and the fiber cladding (i.e., $n_{core} - n_{cladding}$). One of the tapes, 99, in this embodiment, is provided with registration holes 100 along both sides which receive the registration posts 102 when the coupler section is mounted on the coupler section holder.

To make a splice along a break in a cable, the pins, which extend beyond the tapes, are advantageously tapered at each end. The fiber ends are cut flat, and bonding material placed on the ends of the pins. The holders 80 and 81 are then moved towards the coupler section, forcing the pins 98 into the core region 104 of the fibers, as illustrated in FIG. 10A. In addition to aligning the fibers, the pins also displace any gas bubbles present, and prevent the core liquid from escaping. The bonding material 106 seals the fibers to the pin.

Factory prepared liquid core fiber groups can be fabricated such that the fiber ends are slightly flared, as illustrated in FIG. 10B. To splice such fiber, the dielectric pins 105 need not be tapered since they will fit a slight distance, equal to several diameters, into the enlarged portion of the fiber 107, as shown in the illustration. As in FIG. 10A, the bonding material 108 seals the splice.

It will be noted that in both of these arrangements, the pin automatically aligns the fibers and, simultaneously, serves to couple the two fibers together.

To strengthen the splice, any of the techniques described above can be used. For example, in FIG. 8 a grooved cover plate 110 is shown in position over the coupler section. In addition to guiding the fibers over the pins, the cover plate can be bonded to the fibers, the tapes and the pins. Alternatively, a patch can be used, as explained in connection with FIG. 4.

It will be appreciated that the specific embodiments of the splicers illustrated in FIGS. 3, 5 and 9 are merely representative of the essential elements of such devices. Thus, in all cases, it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

I claim:

1. The method of splicing groups of optical fibers, where said fibers are mounted on a tape, including the steps of:

securing the respective fibers of the two groups of fibers to be spliced in approximate coaxial alignment;

cutting the ends of said fibers to equal lengths, as required;

accurately aligning each of the fibers of one group with a different one of the fibers of the other of said groups by means of a cover plate;

bonding said aligned fibers;

and releasing said spliced fibers.

2. The method according to claim 1 including the step of removing said cover plate after said bonding material has set.

3. The method according to claim 1 wherein said cover plate is permanently bonded to said fibers.

4. The method according to claim 1 including the steps of:

placing a splicing patch between said cover plate and said fibers;

and bonding said patch to said fibers.

5. The method of splicing groups of liquid core optical fibers, where said fibers are mounted on a tape, including the steps of:

securing the respective fibers of the two groups of fibers to be spliced in approximate coaxial alignment;

cutting the ends of said fibers to equal length as required;

placing a coupler section comprising a plurality of dielectric pins between said fiber groups such that each of said pins is in approximate coaxial alignment with a different pair of said fibers;

sliding said groups of fibers towards said coupler section until the ends of said pins are inserted into the core portion of said fibers;

bonding said pins to said fibers;

allowing said bonding material to set;

and releasing said spliced fibers.

References Cited

UNITED STATES PATENTS

| 3,734,594 | 5/1973 | Trambarulo | 350—96 B |
|---|---|---|---|
| 3,487,871 | 1/1970 | Kanamori | 156—266 |
| 3,383,192 | 5/1968 | Siegmund | 65—4 |

WILLIAM A. POWELL, Primary Examiner

B. J. LEITTEN, Assistant Examiner

U.S. Cl. X.R.

156—159, 304, 502, 544, 546; 161—143; 350—96 B

UNITED STATES PATENT OFFICE
CERTIFICATE OF CORRECTION

Patent No. 3,798,099            Dated March 19, 1974

Inventor(s) Enrique Alfredo Jose Marcatili

It is certified that error appears in the above-identified patent and that said Letters Patent are hereby corrected as shown below:

Column 1, in the the title, change "Films" to --Fibers--.

Signed and sealed this 13th day of August 1974.

(SEAL)
Attest:

McCOY M. GIBSON, JR.          C. MARSHALL DANN
Attesting Officer             Commissioner of Patents